United States Patent [19]
Willetts

[11] Patent Number: 6,105,597
[45] Date of Patent: Aug. 22, 2000

[54] EMERGENCY SHUT-OFF DEVICE FOR CAM-OVER VALVE

[75] Inventor: Joel Lee Willetts, Warren, Pa.

[73] Assignee: Betts Industries, Inc., Warren, Pa.

[21] Appl. No.: 09/386,036

[22] Filed: Aug. 30, 1999

[51] Int. Cl.$^7$ .................................................. F16K 17/40
[52] U.S. Cl. .............................................. 137/75; 137/79
[58] Field of Search .................................. 137/72, 75, 77, 137/79

[56] References Cited

U.S. PATENT DOCUMENTS

| | | | |
|---|---|---|---|
| 3,165,236 | 1/1965 | Beazer et al. | 137/77 |
| 4,538,632 | 9/1985 | Vogl | 137/77 |

OTHER PUBLICATIONS

Eugene Avallone, "Marks' Standard Handbook for Mechanical Engineers," 9th ed., McGraw–Hill Book Company (New York), p. 6–87–6–91.

Primary Examiner—John Rivell
Assistant Examiner—Ramesh Krishnamurthy
Attorney, Agent, or Firm—Oldham & Oldham Co., LPA

[57] ABSTRACT

A device works as an emergency shut off for a valve having an open and a closed position with a lever for manually moving the valve from one of the positions to the other. The device has a mounting locus in fixed position relative to the valve, a tension member having a first end, a second end and an intermediate portion therebetween, the first end being affixed to the lever and the intermediate portion passing through the mounting locus; a sleeve member slidingly fitted along the tension member, the sleeve member having a first spring retainer firmly fixed thereto along its length and a second spring retainer slidingly received on the sleeve member and coupled thereto by a portion of a releasable adhesive agent; a helical spring for biasing, mounted along an external surface of the sleeve member in a longitudinally compressed manner between the first and second spring retainers; and a first cable stop affixed to the tension member, the sleeve member being constrained between the mounting locus and the first cable stop. When a release agent, such as heat, decouples the second spring retainer from the sleeve member by releasing the releasable adhesive agent, such as a solder, the spring restores to an uncompressed length, effectively moving the first and second spring retainers apart and translating the tension member a sufficient amount to move the valve from one position to the other position. In addition to this automatic action of the device, the valve may be manually moved from one position to the other by a pull on the tension member.

19 Claims, 2 Drawing Sheets

EMERGENCY SHUT-OFF DEVICE FOR CAM-OVER VALVE

The present invention relates to an emergency shut-off device for use with a loading/unloading valve. Particular application is found with regard to such a loading/unloading valve where the valve may be opened and left in an open condition without manual attention. The valve has a cable which will close the valve in an emergency by a pull on the cable. In the event of fire in the vicinity of the shut-off device, the heat of the fire melts a fusible alloy solder and releases a loaded biasing element against the cable, thereby providing the "pull" which could be provided by a manual operator. The shut-off device does not impede the manual operation of the cable.

BACKGROUND OF THE INVENTION

Tanks transport a large variety of dangerous and toxic chemicals on our roads, waterways and railways. A number of different valve systems are used in association with these tanks. In some cases, the valve requires manual operation, and the failure to maintain a tension on a cable associated with the valve results in the valve closing. In certain other tanks, the valve opening means "cams over" to an open position, where it remains locked unless and until the "cam over" position is defeated. While this defeat of the locked open position is often accomplished manually by the pulling of a cable affixed to the valve, new regulations are soon going to require that the valve be equipped with a thermally-active means to defeat the locked position and automatically close the valve, as in the case of a fire where a manual operator cannot physically approach the tank to pull the cable. When such a thermally-active means is provided, the valve should still maintain the ability to be manually closed through the pulling of the cable. In other words, the automated system is intended to be available in addition to and certainly not in lieu of the manual system.

While the "cam over" type loading/unloading valves are useful on a variety of tanks and the like, they are the most common type of valve used in association with intermodal tanks. An intermodal tank is the tank version of a container transport. A rectangular frame generally surrounds a cylindrical tank in the intermodal configuration. This frame may be easily lifted and transported on board a ship, as well as being placed on a truck trailer or a rail car. The loading/unloading valve is typically positioned at the bottom rear of the tank, and the cable to release the "cam over" feature is routed down one of the edges of the tank frame. While the device of the present invention is described as being particularly used with an intermodal tank, it will, of course, be obvious that it would be useful in association with other types of tanks. It is therefore an advantage of the present invention to provide a valve with a cam locking the valve in an open position with a thermally-active closing means which reverses the cam action by pulling a cable, while leaving the cable still manually operable.

SUMMARY OF THE INVENTION

This advantage of the present invention is provided by a device for longitudinally translating an end of a tension member relative to a mounting locus through which the tension member passes, which comprises a sleeve member, a means for biasing and a first cable stop. The sleeve member is slidingly fitted along the tension member, with the sleeve member having a first spring retainer firmly fixed thereto along its length and a second spring retainer slidingly received on the sleeve member and coupled thereto by a portion of a releasable adhesive agent. The means for biasing is mounted along an external surface of the sleeve member in a longitudinally compressed manner between the first and second spring retainers. The first cable stop is affixed to the tension member, with the sleeve member being constrained between the mounting locus and the first cable stop in a manner that the presence of a release agent decouples the second spring retainer from the sleeve member, allowing the biasing means to restore to an uncompressed length, effectively moving the first and second spring retainers apart.

In one embodiment, the release agent is heat and the releasable adhesive agent is a fusible solder.

In one embodiment, the tension member is flexible, especially a cable, and, even more especially, a cable manufactured from braided steel wires.

In one embodiment, the first spring retainer is a collar which is affixed to the sleeve member, and, in another embodiment, the first spring retainer is an integral radial enlargement of the sleeve member.

In one embodiment, the second spring retainer is a collar.

In one embodiment, the device further comprises a second cable stop secured to the tension member between the first cable stop and the end of the tension member.

In a particular application of the invention, the device serves as an emergency shut-off device for a valve having an open and a closed position with a lever for manually moving the valve from one of the positions to the other, in a manner such that the presence of a release agent decouples the second spring retainer from the sleeve member, allowing the biasing means to restore to an uncompressed length, effectively moving the first and second spring retainers apart and translating the tension member a sufficient amount to move the valve from one position to the other position.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

Figure 1:
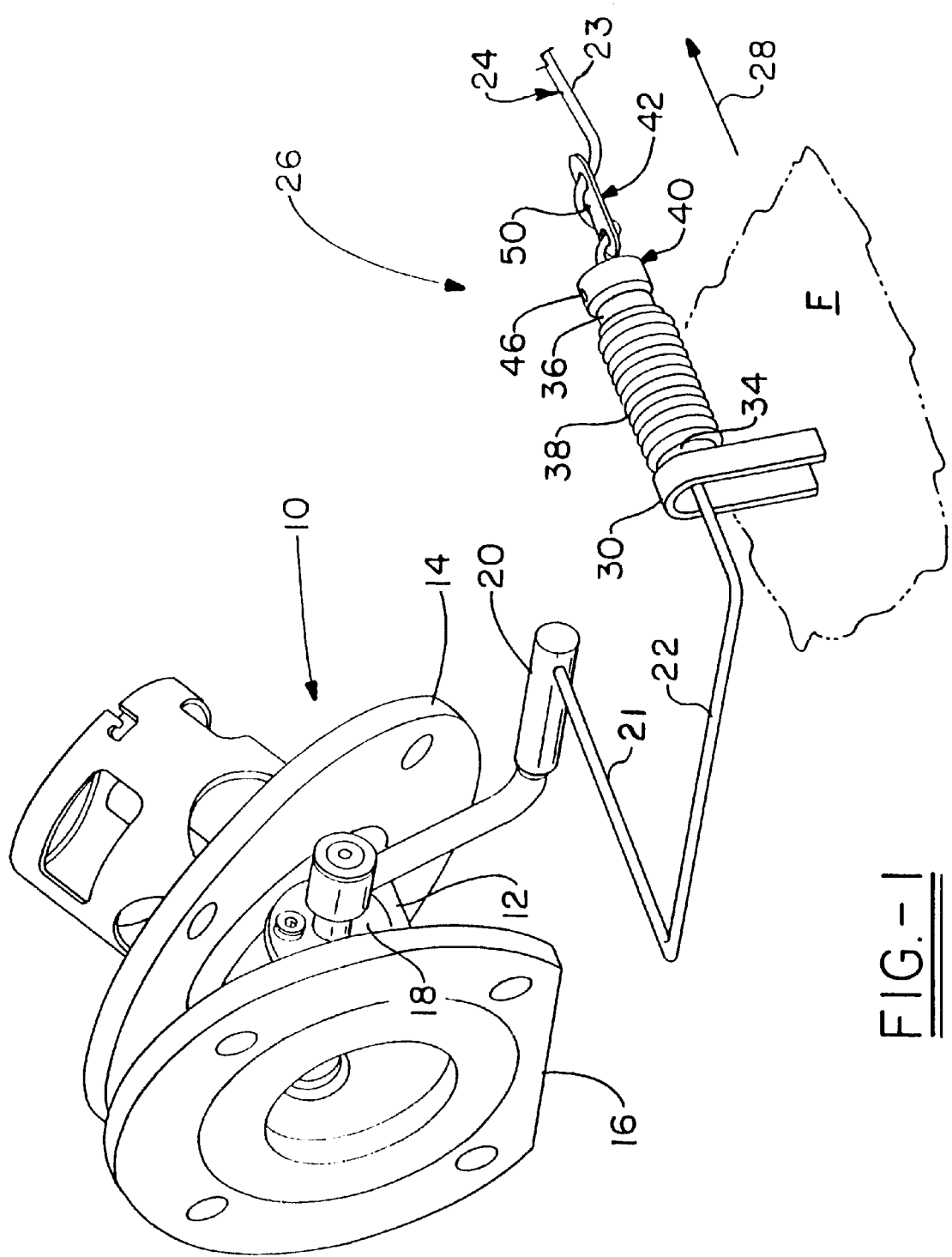
FIG. 1 shows a first perspective view of the present invention.

The present invention is shown in a perspective view in FIG. 1. The valve, shown generally as 10, has a body 12 with a first mounting flange 14 and second mounting flange 16. The first mounting flange 14 is used to secure the valve body 12 to a vessel (not shown) with an inlet side of the valve 10 extending into an interior of the vessel. The second mounting flange 16 is used to affix a further valve, such as a butterfly valve (not shown) or the like to the outlet side of the valve 10. Located between the mounting flanges 14, 16 in the valve body 12 is the valve mechanism 18, which in this case is a "poppet" type valve with an external lever 20. The valve mechanism 18 has a first "open" position and a second "closed" position. The valve 10 depicted in FIG. 1 has the valve mechanism 18 depicted in its "open" locked position, allowing flow therethrough. A clockwise rotation of the lever 20 of FIG. 1 through a portion of a circular arc (about 30°) will move the lever to its "closed" position. While the lever 20 allows manual closure of the valve 10, the lever also has a length of a tension member 24, in this case, a cable, affixed to it. The cable 24 will, of course, have respective first and second ends, shown as 21 and 23, respectively, and an intermediate portion 22 therebetween. The first portion 21 and the intermediate portion 22 of the cable 24 may be routed through a series of guides and the like (not shown), to achieve the non-linear condition shown in FIG. 1. The emergency shut-off device 26 of the present invention is positioned along the cable 24, as will be explained further below. A pull of the cable 24 in the direction shown generally by arrow 28 in FIG. 1 causes lever 20 to move clockwise, releasing a locking means (not shown) in the valve 10 and moving the valve mechanism 18 to its "closed" position, in which no flow is permitted. The presence of lever 20 and associated cable 24 provide an operator with one manual means for opening the valve (the lever) and two manual means for closing the valve (the lever and the cable). These are known in the prior art and will be familiar to one of skill in this art. Of these means, the lever 20 is the preferred means for opening or closing the valve 10, but the cable 24 allows the valve to be closed from a remote position. The cable 24 does not permit remote opening of the valve in the configuration shown.

In a particular application of the present invention, the vessel in which the valve 10 is installed will be the intermodal type of tank described in the background section above, in which the tank will be housed in an external frame, a portion of which is shown in FIG. 1 as reference figure F. Such a frame F will be fixed in position relative to the valve 10, and the cable 24 will be run along the frame so that the cable is relatively accessible to a potential operator outside the frame.

Figure 2:
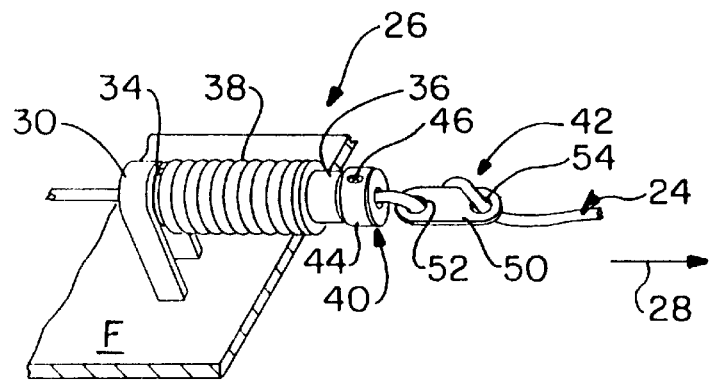
FIG. 2 shows a second perspective view of the shut-off device of the present invention.
Figure 3:
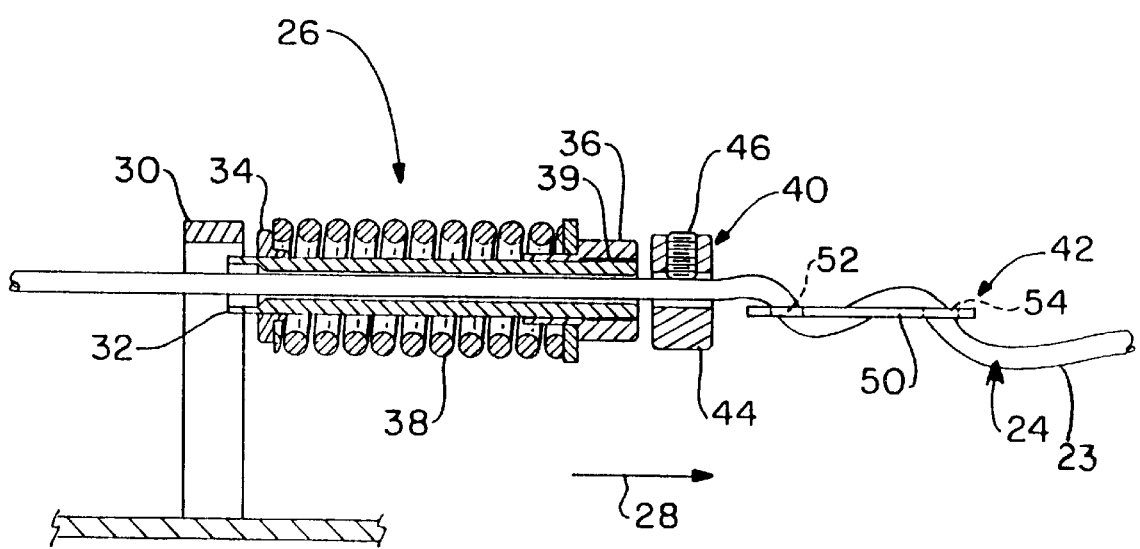
FIG. 3 shows a side sectional view of the shut-off device.

The operation of the emergency shut-off device 26 of the present invention will be better understood when reference is made to FIGS. 2 and 3, which show a different perspective view than FIG. 1 and an elevation section view, respectively. A first feature of the shut-off device 26 is actually not a part of the device itself. For device 26 to properly operate, a mounting locus 30 must be determined. The mounting locus 30 will be fixed relative to the frame F and along a reasonable course of tension member 24. Since valve 10 is fixed relative to the frame F and the mounting locus is fixed on the frame, the mounting locus 30 is necessarily also fixed relative to the valve. In FIG. 2, a preferred mounting locus 30 shown is a cable guide affixed to frame F. A sleeve member 32 having first and second ends is slidingly fitted along cable 24 so that the sleeve member is between the mounting locus 30 and the second end of the cable. A first spring retainer 34 is attached to the first end of sleeve member 32 and a second spring retainer 36 is attached to the second end. Between the first and second spring retainers 34, 36 is a helical spring 38 under longitudinal compression, as is very clearly shown in FIG. 3. In the preferred embodiment shown, the spring retainers 34, 36 are radially flanged annular collars which are affixed to the sleeve member 32, but the first retainer 34 could easily be embodied as a radial enlargement of the sleeve member 32. In any case, the first retainer 34 is firmly affixed to the sleeve member 32. In the preferred embodiment, the second retainer 36 is a collar which is held in place on, or coupled to, the sleeve member 32 by a portion 39 of a releasable adhesive agent interposed into the annular space between the second retainer and the sleeve member. In the preferred embodiment, the releasable adhesive agent is a thermally-active solder which melts at a pre-determined temperature. The portion 39 of solder used should be sufficient to hold the second retainer 36 in place at normal ambient temperatures. In the preferred embodiments, the solder would be selected from one of several known low-melting formulations so that it will melt and allow the second retainer 36 to slide along and off of the end of sleeve member 32 as the helical spring 38 restores to its uncompressed length.

The shut-off device 26 is positioned on the cable 24 so that it is between the mounting locus 30 and a first cable stop 40, which has been affixed along the cable proximate to the second retainer 36 while the valve 10 is in the open position. A second cable stop 42 is proximate to the first cable stop 40 opposite the second retainer 36. In the preferred embodiment of the invention, the first cable stop 40 is an annular body 44 with a radial bolt 46 threaded therein for securing the cable as it passes through the hole 48 in the stop. In the preferred embodiment, the second cable stop 42 is a elongate plate 50 with first and second holes 52, 54 therethrough. The cable 24 is threaded through the holes 52, 54.

If the portion 39 of fusible solder melts, as would occur in the event of a fire near the device 26, the restorative expansion of the spring 38 will urge the first and second retainers 34, 36 away from each other. As this occurs, the first retainer 34 will bear on the mounting locus 30 and the second retainer 36 will bear on the first cable stop 40. The restorative force of spring 38 will move first cable stop 40 away from the mounting locus 30. Since first cable stop 40 is affixed to the cable by the bolt 46, the cable 24 will be moved relative to mounting locus 30 in the direction of arrow 28. If the spring force and amount of longitudinal expansion available to spring 38 are sufficient, the cable movement effected by the release of the spring 38 will act exactly as a manual pull on the cable in the direction of arrow 28, closing valve 10. It will be recognized that second cable stop 42 is not necessary for the operation of the invention if first cable stop 40 achieves its purpose, but would be usually provided as a safety factor in the event that the first cable stop would fail to hold on the cable 24. To provide for effective operation of the shut-off device 26, cable 24 should be taut when the shut-off device is set into place, first retainer 34 should abut against mounting locus 30 and first cable stop 40 should abut against second retainer 36. When set in this manner, all of the longitudinal restoration of the spring 38 will translate into rotation of lever 20. It is preferred to have the amount of restoration available to spring 38 exceed that needed to "cam over" the valve mechanism 18 from "open" to "closed."

It will be readily noted that when the shut-off device 26 is positioned on the cable in the compressed configuration of FIG. 3 between mounting locus 30 and first cable stop 40, cable 24 is not constrained against movement in the direction of arrow 28, so the cable is still useful for manual shut-off of the valve 10. The presence of the shut-off device 26 constrains movement of cable 24 in the direction opposite arrow 28 (that is, toward mounting locus 30), but once the valve 10 is opened into its "locked" position, cable movement in that direction is unnecessary, since no additional lever motion in that direction is permitted by the valve mechanism 18.

The solders useful to provide the solder portion 39 are generally formulated from tin, bismuth, lead and cadmium, as well as some additional metals. Tables of fusible alloys are readily available in a variety of reference manuals, such as *Marks Standard Handbook for Mechanical Engineers*. For example, an alloy generally known as Woods metal melts between 158F and 162F. It is 12.5 wt % tin, 50.0 wt % bismuth, 25.0 wt % lead and 12.5 wt % cadmium. A higher melting fusible alloy is 55.5 wt % bismuth and 44.5 wt % lead. A eutectic alloy of this material will melt at 255F. Several known fusible alloys melt in the 240F to 250F range. Actual selection of the fusible alloy used as a solder will be a matter of design choice.

While a helical spring 38 is shown and described with the preferred embodiment of the invention, the use of other compressible biasing means will also be known to one of skill in the art. The primary advantage of using a helical spring 38 is the manner in which is surrounds the sleeve member 32 and applies an even axial pressure around the entire circumference of second retainer 36 upon the melting of the solder portion 39.

While the tension member 24 disclosed in the preferred embodiment is a cable, and is, in the most preferred embodiment, a braided wire strand cable which would be resistant to chemicals of the type which may be used in the tank with which it is associated. Such a cable would also have a sufficient amount of heat resistance to retain its functionality in the event of a fire. A chain or a rigid rod would also be acceptable tension members, the inventor's general definition of "tension member" being a device which may transfer a tensile force from one end to the other, even if the device may not transfer a compressive force. It would not be appropriate to use a tension member 24 which would be susceptible to the heat, chemicals or the like which would be present when the device 26 would need to be relied upon. One should also exercise some care in the use of chain to avoid possibly catching the links in guide members, which could prevent effective use of the shut-off device 26.

While the embodiment shown and described above has the fixed retainer 34 abutting the mounting locus 30 and the retainer 36 held in place by the thermally-active solder portion 39 abutting the first cable stop 40, it will certainly be recognized that the device 26 could be installed in the reverse position.

The preferred embodiment of the invention uses a portion 39 of a fusible solder which would react in the presence of a predetermined temperature to melt, effectively decoupling the second spring retainer 36 from the sleeve member 32, allowing the second spring retainer to slide along the sleeve member and allowing the biasing means to restore to an uncompressed length, effectively moving the first and second spring retainers apart. However, there are other releasable adhesive agents which could normally adhere the second retainer to the sleeve member, but release in the presence of a specific predetermined release agent to decouple the second retainer from the sleeve member. One such example would be a water-soluble glue which would release in the presence of water or high humidity to allow the device to operate.

While the immediate application of the device of the present invention is to illustrate a situation where the shut-off device 26 is used to close valve 10, it will be understood that applications exist where the identical device may be used to remotely open the valve 10, but that these application require that the valve mechanism 18 be installed such that the position shown in FIG. 1 represents the "closed" state of the valve and that clockwise rotation of the lever 20 opens the valve rather than closes it. Occasions where this configuration of the emergency device (which would then be properly called an emergency opening device) are well known to those of skill in this art. One such situation, for illustrative purpose only, is where it is desired to void a tank of its contents in the event of fire around the tank Although the present invention has been described above in detail, the same is by way of illustration and example only and is not to be taken as a limitation on the present invention. Accordingly, the scope and content of the present invention are to be defined only by the terms of the appended claims.

What is claimed is:

1. A device for longitudinally translating an end of a tension member relative to a mounting locus through which the tension member passes, comprising:

a sleeve member slidingly fitted along the tension member, the sleeve member having a first spring retainer firmly fixed thereto along its length and a second spring retainer slidingly received on the sleeve member and coupled thereto by a portion of a releasable adhesive agent;

a means for biasing, mounted along an external surface of the sleeve member in a longitudinally compressed manner between the first and second spring retainers; and a first cable stop affixed to the tension member, the sleeve member being constrained between the mounting locus and the first cable stop;

such that the presence of a release agent decouples the second spring retainer from the sleeve member, allowing the biasing means to restore to an uncompressed length, effectively moving the first and second spring retainers apart.

2. The device of claim 1 wherein the release agent is heat and the releasable adhesive agent is a fusible solder.

3. The device of claim 1 wherein the tension member is flexible.

4. The device of claim 3 wherein the tension member is a cable.

5. The device of claim 4 wherein the cable is manufactured from braided steel wires.

6. The device of claim 1 wherein the first spring retainer is a collar which is affixed to the sleeve member.

7. The device of claim 1 wherein the second spring retainer is a collar.

8. The device of claim 1 wherein the biasing means is a helical spring.

9. The device of claim 1 further comprising a second cable stop secured to the tension member between the first cable stop and the end of the tension member.

10. An emergency shut-off device for a valve having an open and a closed position with a lever for manually moving the valve from one of the positions to the other, the device comprising:

a mounting locus in fixed position relative to the valve;

a tension member having a first end, a second end and an intermediate portion therebetween, the first end being affixed to the lever and the intermediate portion passing through the mounting locus;

a sleeve member slidingly fitted along the tension member, the sleeve member having a first spring retainer firmly fixed thereto along its length and a second spring retainer slidingly received on the sleeve member and coupled thereto by a portion of a releasable adhesive agent;

a means for biasing, mounted along an external surface of the sleeve member in a longitudinally compressed manner between the first and second spring retainers; and a first cable stop affixed to the tension member, the sleeve member being constrained between the mounting locus and the first cable stop;

such that the presence of a release agent decouples the second spring retainer from the sleeve member, allowing the biasing means to restore to an uncompressed length, effectively moving the first and second spring retainers apart and translating the tension member a sufficient amount to move the valve from one position to the other position.

11. The device of claim 10 wherein the release agent is heat and the releasable adhesive agent is a fusible solder.

12. The device of claim 10 wherein the tension member is flexible.

13. The device of claim 12 wherein the tension member is a cable.

14. The device of claim 13 wherein the cable is manufactured from braided steel wires.

15. The device of claim 12 wherein the intermediate portion of the tension member is threaded through a series of guides between the lever and the mounting locus.

16. The device of claim 10 wherein the first spring retainer is a collar which is affixed to the sleeve member.

17. The device of claim 10 wherein the second spring retainer is a collar.

18. The device of claim 10 wherein the biasing means is a helical spring.

19. The device of claim 10 further comprising a second cable stop secured to the tension member between the first cable stop and the end of the tension member.

* * * * *